United States Patent
Guim Bernat et al.

(10) Patent No.: US 10,320,710 B2
(45) Date of Patent: Jun. 11, 2019

(54) RELIABLE REPLICATION MECHANISMS BASED ON ACTIVE-PASSIVE HFI PROTOCOLS BUILT ON TOP OF NON-RELIABLE MULTICAST FABRIC IMPLEMENTATIONS

(71) Applicant: INTEL CORPORATION, Santa Clara, CA (US)

(72) Inventors: Francesc Guim Bernat, Barcelona (ES); Charles A. Giefer, Seattle, WA (US); Raj K. Ramanujan, Federal Way, WA (US); Robert G. Blankenship, Tacoma, WA (US); Narayan Ranganathan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 356 days.

(21) Appl. No.: 14/865,162

(22) Filed: Sep. 25, 2015

(65) Prior Publication Data

US 2017/0093756 A1    Mar. 30, 2017

(51) Int. Cl.
*H04L 12/931* (2013.01)
*H04L 5/00* (2006.01)
(Continued)

(52) U.S. Cl.
CPC .......... *H04L 49/201* (2013.01); *H04L 5/0055* (2013.01); *H04L 12/18* (2013.01); *H04L 43/106* (2013.01)

(58) Field of Classification Search
CPC ...... H04L 5/0055; H04L 12/18; H04L 43/106
See application file for complete search history.

(56) References Cited

U.S. PATENT DOCUMENTS

2008/0240118 A1    10/2008  Roy et al.
2009/0262677 A1    10/2009  Banerjea et al.
(Continued)

FOREIGN PATENT DOCUMENTS

WO    2010/151037 A2    12/2010

OTHER PUBLICATIONS

International Search Report and Written Opinion received for PCT Patent Application No. PCT/US2016/053586, dated Jan. 4, 2017, 16 pages.
(Continued)

*Primary Examiner* — Robert M Morlan
*Assistant Examiner* — Pamit Kaur
(74) *Attorney, Agent, or Firm* — Law Office of R. Alan Burnett, P.S

(57) ABSTRACT

Methods, apparatus, and systems for reliable replication mechanisms based on active-passive HFI protocols build on top of non-reliable multicast fabric implementations. Under a first hardware-based scheme, a reliable replication mechanism is (primarily) implemented via Host Fabric Interfaces (HFIs) coupled to (or integrated in) nodes coupled to a non-reliable fabric. Under this approach, the HFIs take an active role in ensuring reliable delivery of multicast messages to each of multiple target nodes. Under a second hybrid software/hardware scheme, software running on nodes is responsible for determining whether target nodes have confirmed delivery of multicast messages and sending retry messages for cases in which delivery is not acknowledged within a timeout period. At the same time, the HFIs on the target nodes are responsible for generating reply messages containing acknowledgements rather than software running on the target nodes.

25 Claims, 9 Drawing Sheets

(51) Int. Cl.
*H04L 12/26* (2006.01)
*H04L 12/18* (2006.01)

(56) References Cited

U.S. PATENT DOCUMENTS

2011/0069705 A1* 3/2011 Glasser ............... H04L 12/1836
370/390
2013/0336319 A1 12/2013 Liu et al.
2014/0355604 A1* 12/2014 Mutschler ............... H04L 47/10
370/390

OTHER PUBLICATIONS

International Preliminary Report on Patentability and Written Opinion received for PCT Patent Application No. PCT/US2016/053586, dated Apr. 5, 2018, 12 pages.
Extended European Search Report EP Application EP 16 84 9815.
Wei Kuan Yu et al: "High performance and reliable NIC-based multicast over Myrinet/GM-2", Parallel Processing, 2003. Proceedings. 2003 International Conference on Oct. 6-9, 2003, Piscataway, NJ, USA,IEEE, Oct. 6, 2003, pp. 197-204.
Jijun Cao et al: "Using NIC-Based Multicast Scheme to Improve Forwarding Rate for Application Layer Multicast", Asia-Pacific Service Computing Conference, The 2nd IEEE, IEEE, PI, Dec. 1, 2007, pp. 179-186.

* cited by examiner

US 10,320,710 B2

RELIABLE REPLICATION MECHANISMS BASED ON ACTIVE-PASSIVE HFI PROTOCOLS BUILT ON TOP OF NON-RELIABLE MULTICAST FABRIC IMPLEMENTATIONS

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In addition to high-speed interconnects associated with Ethernet connections, high-speed interconnect may exist in other forms. For example, one form of high-speed interconnect InfiniBand, whose architecture and protocol is specified via various standards developed by the InfiniBand Trade Association. Another example of a high-speed interconnect is Peripheral Component Interconnect Express (PCI Express or PCIe). The current standardized specification for PCIe Express is PCI Express 3.0, which is alternatively referred to as PCIe Gen 3. In addition, both PCI Express 3.1 and PCI Express 4.0 specification are being defined, but have yet to be approved by the PCI-SIG (Special Interest Group). Moreover, other non-standardized interconnect technologies have recently been implemented.

An important aspect of data center communication is reliable or confirmed data delivery. Typically, a reliable data transport mechanism is employed to ensure data sent from a source has been successfully received at its intended destination. Current link-layer protocols, such as Ethernet, do not have any inherent facilities to support reliable transmission of data over an Ethernet link. This is similar for the link-layer implementation of InfiniBand. Each address reliable transmission at a higher layer, such as TCP/IP. Under TCP, reliable delivery of data is implemented via explicit ACKnowledgements (ACKs) that are returned from a receiver (at an IP destination address) to a sender (at an IP source address) in response to receiving IP packets from the sender. Since packets may be dropped at one of the nodes along a route between a sender and receiver (or even at a receiver if the receiver has inadequate buffer space), the explicit ACKs are used to confirm successful delivery for each packet (noting that a single ACK response may confirm delivery of multiple IP packets). The transmit-ACK scheme requires significant buffer space to be maintained at each of the source and destination devices (in case a dropped packet or packets needs to be retransmitted), and also adds additional processing and complexity to the network stack, which is typically implemented in software. For example, as it is possible for an ACK to be dropped, the sender also employs a timer that is used to trigger a retransmission of a packet for which an ACK has not been received within the timer's timeout period. Each ACK consumes precious link bandwidth and creates additional processing overhead.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
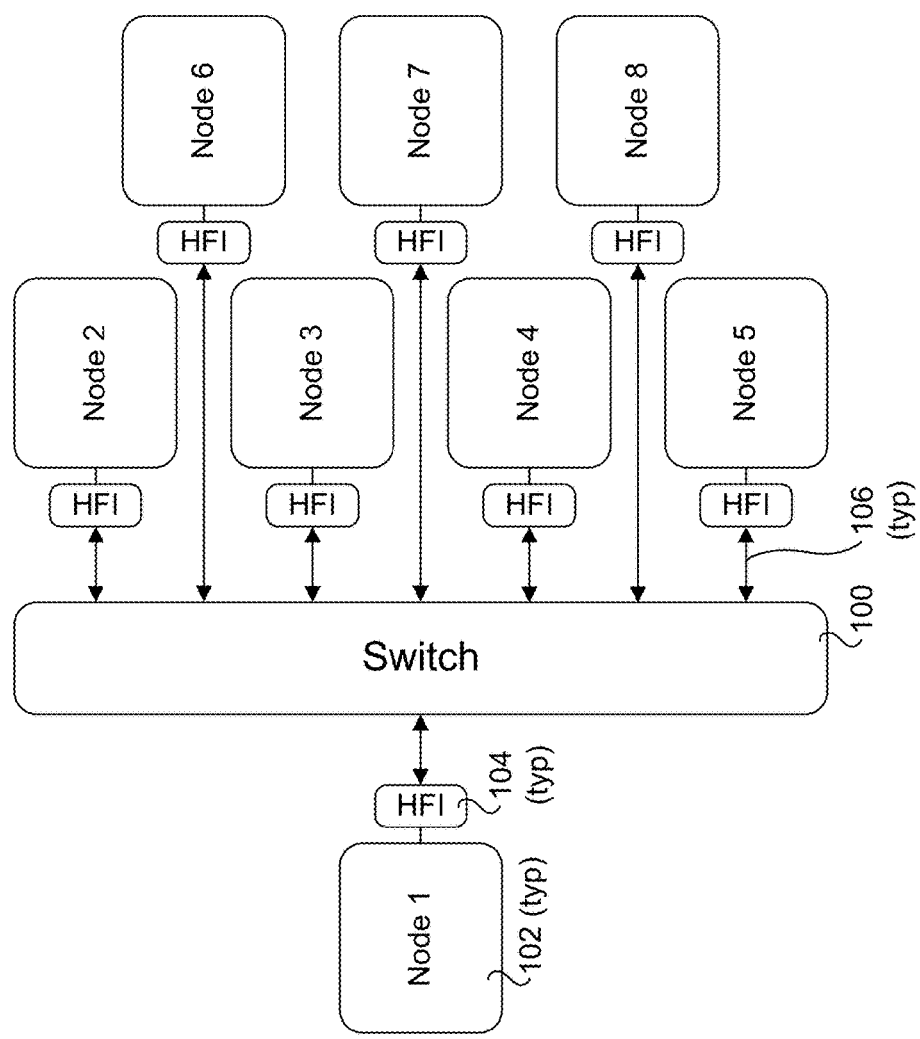
FIG. 1 is a schematic block diagram of a system including multiple nodes interconnected via multiple fabric links coupling each node to a switch.

Embodiments of methods, apparatus, and system for reliable replication mechanisms based on active-passive HFI protocols build on top of non-reliable multicast fabric implementations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Multicast messages are used to implement one-to-many nodes communications. In this scenario, one node (referred to as an originator or originator node) sends one or more messages through the Fabric Interconnect targeting different nodes connected to the Fabric (referred to as targets or target nodes). If the multicast is reliable, the originator is guaranteed that eventually all of the messages will be successfully delivered to all of the targets, enabling the targets to store the message content in persistent storage. On the other hand, non-reliable multicasts implementations cannot guarantee that all the messages will be delivered to the targets.

Reliability can be implemented with passive and active roles with respect to software implication. In passive-based approaches, software only needs to generate the multicast message and the hardware support will be responsible of implementing the reliability. On the other hand, in an active-based approach, the software is the one responsible for implementing the reliability. In this case, when the targets receive the message, the hardware wakes up the network software stack. At this point, the network software stack needs to communicate the acknowledgement to the originator actively and to the storage to the persistent memory.

The Fabric Interconnect is responsible for implementing multicast semantics from the interconnect point of view (e.g., routing protocols, message transmit, etc.). In one non-limiting exemplary embodiment, the Fabric component implementing the multicast semantics is a switch. As shown in FIG. 1, a switch 100 is configured to support unicast and multicast communication between a plurality of nodes 102, where each node includes a Host Fabric Interface (HFI) 104, that is coupled to switch 100 via a Fabric link 106. For convenience, nodes 102 may be referred to by their node number, such as Node 1, Node 2, etc.

Figure 1A:
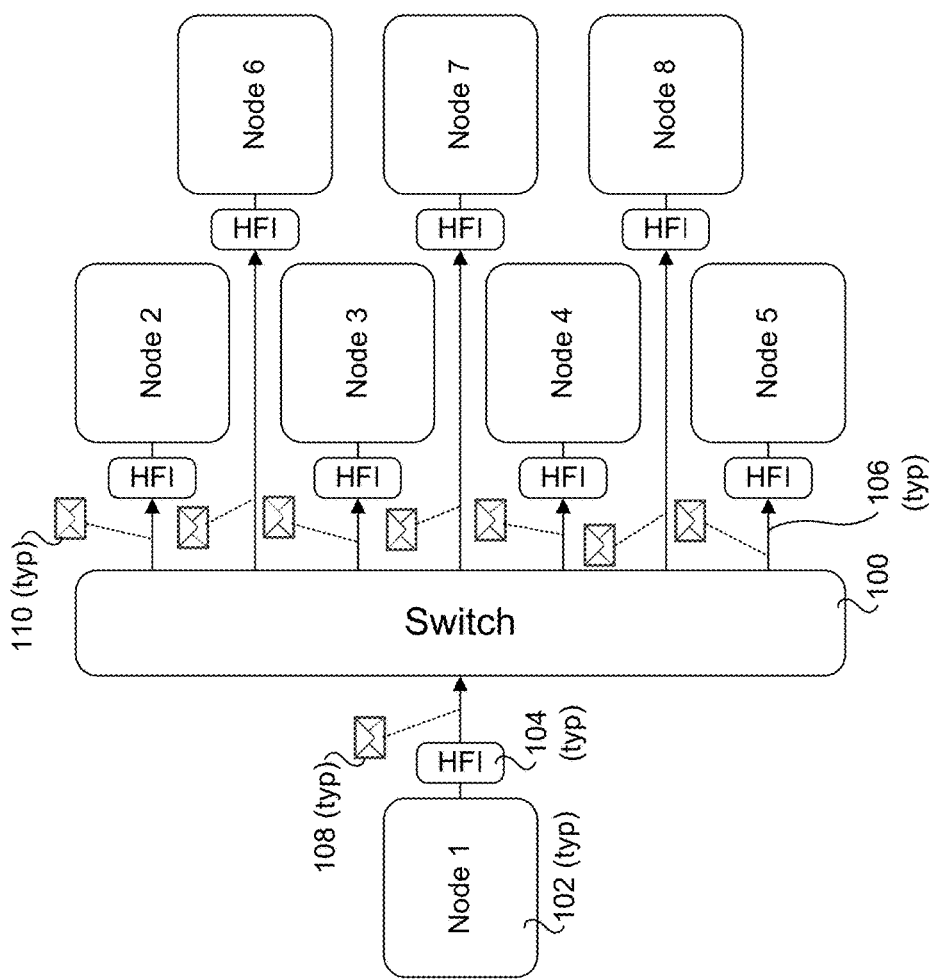
FIG. 1a is a schematic block diagram of the system of FIG. 1 illustrating a multicast of a packet from an originator node to seven target nodes.
Figure 2:
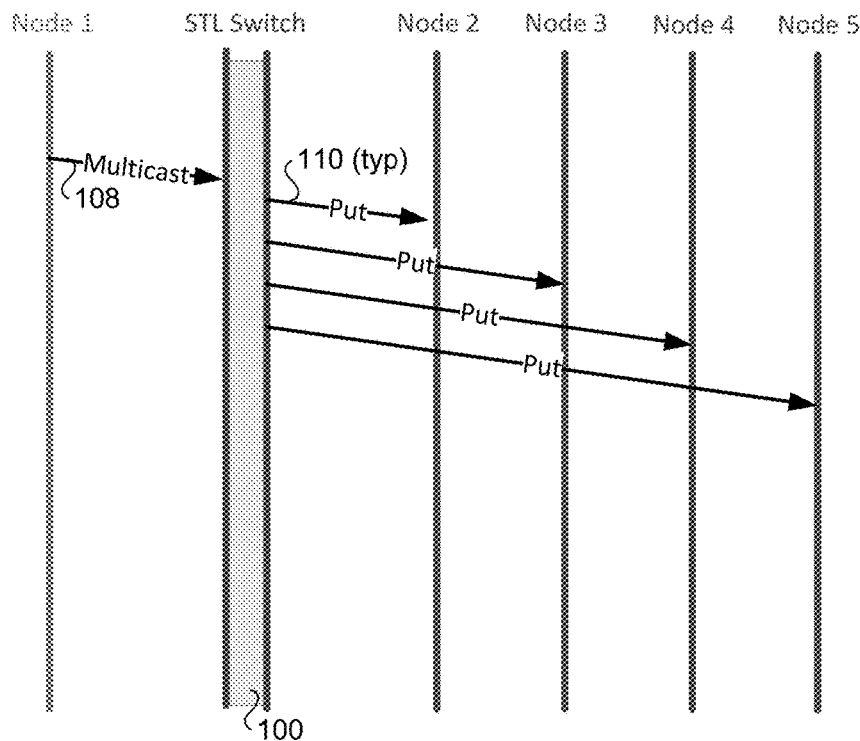
FIG. 2 is a message flow diagram illustrating a multicast message delivery mechanism implemented by a switch.
Figure 3:
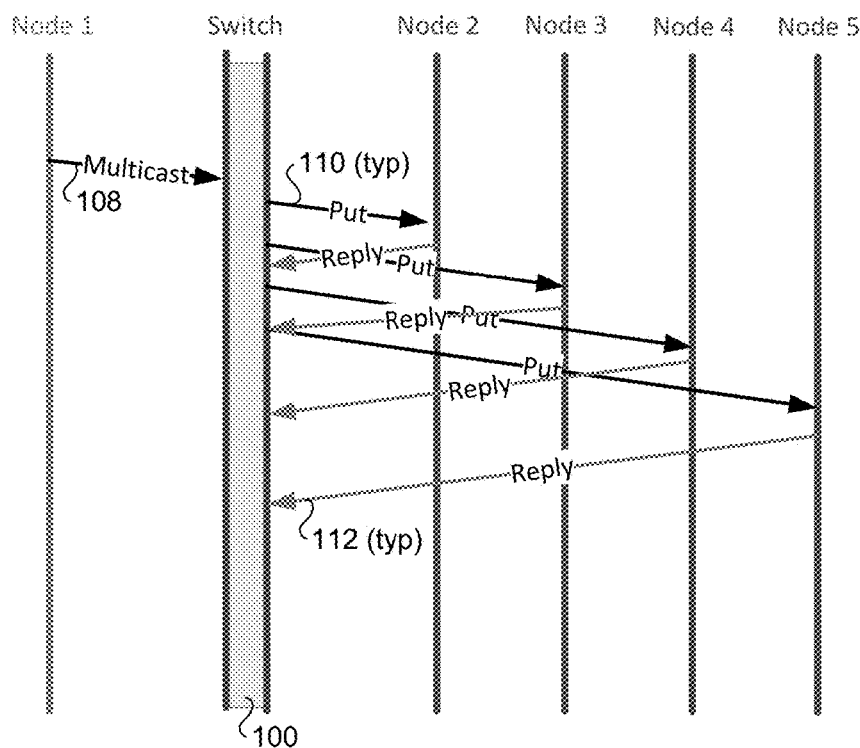
FIG. 3 is a message flow diagram illustrating a reliable delivery mechanism for multicast messages implemented by a switch.

As shown in FIG. 1a, Node 1 is an originator of a message that is to be multicast to each of Nodes 2-8. First, Node 1 generates a multicast request 108 using its HFI 104 and sends the message to switch 100. Multicast request 108 includes a header that identifies the Fabric addresses of each of Nodes 2-8 (or other indicia used by switch 100 to map nodes to their Fabric addresses using a mapping table or the like), along with the message to be sent to each target node, referred to as the multicast message. Second, once the message sinks in to switch 100, the switch inspects the message header and generates seven independent unicast messages 110 (one per destination Node 2-8) corresponding to the multicast request, wherein each unicast message 110 includes the data content of the multicast message in multicast request 108, but has a unicast header rather than a multicast header that includes a destination Fabric address of the destination node. In FIGS. 2 and 3, unicast messages 108 are depicted as a put messages; however, this is merely exemplary and non-limiting, various different types of messages may be multicast.

It is common in the art to refer to each recipient identified in an original multicast message as receiving a multicast message. In this context, the received message is termed a multicast message because it represents an individual copy of a message (sent to a given recipient) that is sent to multiple recipients concurrently. However, the received message is technically a unicast message, since a multicast message header under most protocols includes a list of destination addresses, while a unicast message only includes a single destination address. For purposes herein, the recipient of a multicast message receives a unicast message; however, this unicast message may also be considered a multicast message under the conventional viewpoint.

From this point, if the multicast implementation the Fabric provides is reliable, as shown in FIG. 3, each node sends one reply message 112 containing an acknowledge back to the switch (once the message is stored into the target node's persistent memory). Once the switch as confirmed receipt of an acknowledgment from each target node, the switch retires the multicast from its internal structures. In case that an acknowledgement timeout occurs (due to an acknowledgment from a given node not being received within the timeout period), switch 100 will retry sending the message 110 to that node. Under the message flow configuration of FIG. 3, the reliable flow is implemented passively from the network software stack point of view (passive target).

However, in many cases, due to complexity, area and power reasons, the Fabric does not support this type of reliability. Thus, as depicted in FIG. 2, in a non-reliable implementation switch 100 de-allocates its internal structures associated with the multicast once the last message is sent. In this case, no acknowledgements are expected from the target nodes.

Figure 4:
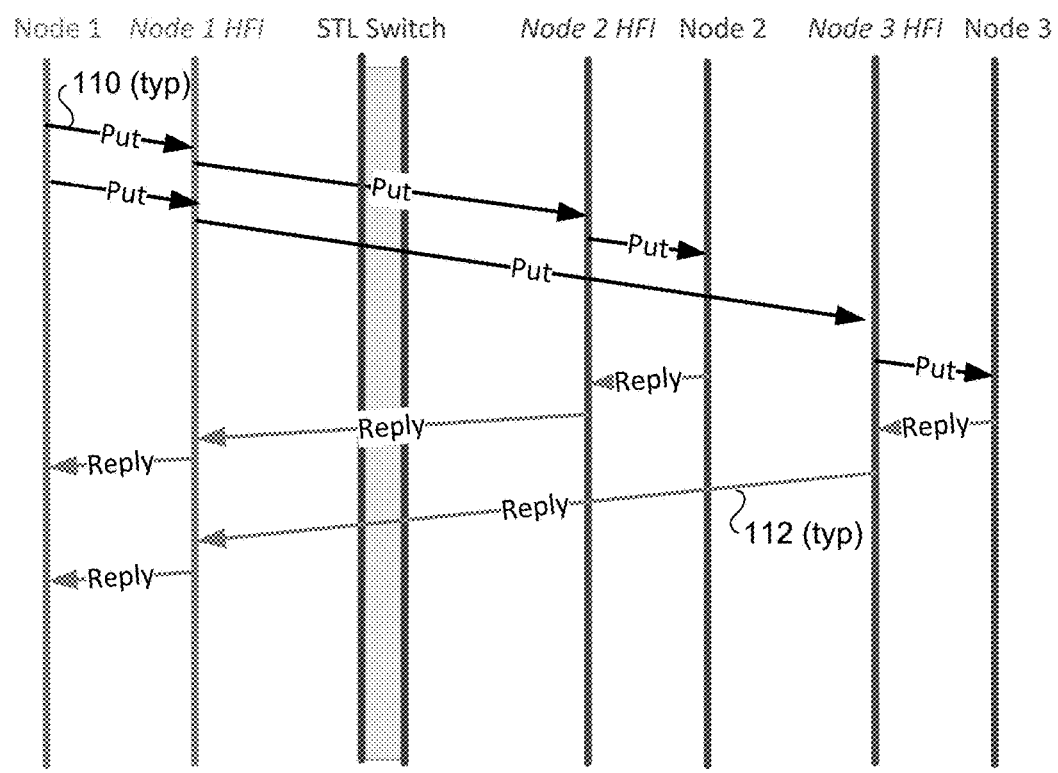
FIG. 4 is a message flow diagram illustrating a software-based reliable delivery scheme under which confirmed deliver of each message is returned to a software-based message sender.

In many situations, non-reliable multicasts are not acceptable for end-costumers. For instance, in the case of data replication, the network software stack needs to be sure that the data has been successfully delivered to each of the target nodes. Under a typical reliable multicast scheme, the network software stack implements the multicast acknowledgements, as shown in FIG. 4. In this example, a multicast is effected by a network software stack in Node 1 by generating a message body to be multicast and generating respective unicast messages 110 with the same message body to each of Nodes 2 and 3. Upon receipt at the HFIs for Node 2 and Node 3, the respective HFI forwards message 110 to the network software stack operating on Node 2 and Node 3. The network software stack then generates a respective reply message 112 containing an acknowledgement that unicast message 110 has been successfully received, and returns the reply message to Node 1. Under the software-based approach, the HFIs perform their normal function in providing interfaces to the fabric, but otherwise do not participate in reliability-related operations, which are handled by the network software stack.

As discussed, current fabric solutions assume that reliable multicast is implemented by the network software stack. This implementation has clear drawbacks in terms of Fabric utilization and efficiency in the originator side. First, the fabric is more heavily utilized, as separate messages are send between the originator and the targets (e.g., separate messages from the originator to the targets, and separate ACKs returned from the targets to the sender). Second, this approach results in unnecessary socket utilization (memory, on die interconnect etc.), and consumes more energy, wasting power.

In the data center space, the described flow is getting more and more necessary for server and cloud workloads. In many of the enterprise applications, replication is a fundamental part of the system. Examples of software relying on replication schemes include databases, such as Oracle, SAP, IBM DB2, Microsoft SQL server and MySQL, as well as application that employ databases or other data storage schemes requiring replication (e.g., financial applications). Replication is also common for cloud-hosted services and data storage, both of which are typically implemented via one or more data centers.

Embodiments of the proposed reliable multicast schemes described herein provide co-designed hardware and software solutions to implement reliable multicasts in those scenarios where the Fabric Interconnect does not support reliable multicast. As will be discussed below with referenced to FIG. 11, these solutions provide substantial reductions in Fabric traffic compared to the current software (only)-based approaches.

HFI Passive-Passive Reliable-Multicast Implementation

Under a first approach, referred to as HFI Passive-Passive Reliable-multicast, a Host Fabric Interface that is extended to artificially implement the reliability has a mostly passive role (e.g., no action is required in 90% of the cases). The HFI for the originator node includes a retry queue that stores information for each multicast send to the fabric: the original request plus a list of targets with a pending acknowledgement. On a timeout, the HFI will reuse the multicast message, but the message will only be sent to those target nodes for which an acknowledgement has yet to be received.

In this first solution, the HFI is extended to fully implement the reliable multicast semantics. Under this scheme, the target and originator act as passive actors except for the case of a retry message arriving to the target. In this case, the network software stack in the target side is responsible for determining whether the first message was processed or not.

Under one embodiment, the extension to the HFI include:

1. The HFI employs one or more data structures (e.g., a table or a set of related tables or other data structures) that are used to track the outstanding multicast messages. In one embodiment, a multicast table is implemented that contains:
1.1 The original multicast request.
1.2 Timestamp when it was generated.
1.3 A list of pending acknowledgements.
1.4 A timeout counter decremented at some fixed time interval.

As an alternative, the HFI may employ a timeout counter for each multicast request, with information that links timeout counters to multicast requests (such as a row ID, surrogate key, or other indicia for a given table entry).

2. When a multicast request is generated in the HFI of the originator node, the HFI allocates one entry (or set of entries, if applicable) in the multicast table and sends out the multicast. In one embodiment the multicast contains an identifier (ID) that is used in the acknowledgement reply messages generated by the target HFIs.

3. When a multicast put (embodied as a unicast put message) reaches the target, the target HFI generates an acknowledgement once the put is assured to be stored in memory in at least one of the HFI and the node host platform, as described below in further detail. The generated acknowledgement includes the multicast ID.

4. When an acknowledgment for that multicast is received for a given outstanding multicast, the target ID for the acknowledgment is removed from the pending list. Once the pending list is empty, the multicast request can be safely removed from the multicast retry queue.

5. When the timeout counter reaches zero for a given entry:
5.1 The message will be retried but only to the target nodes in the pending list (that is, the target nodes that did not return a reply message within the timeout period). The retry message is a unicast message derived from the original multicast message. In one embodiment, one of the bits in the unicast message header is used to indicate that this is a retry message.
5.2 In the retry case, the target HFI does not work actively as in the first default case (step 3). Rather, the HFI wakes up the network software stack at the destination to notify the software stack that it has received the retry message. The network software stack is then responsible to determine if the current retry message to be sunk or not to memory.
5.3 The timeout counter is reset to the default value.

6. When a message is received on the target HFI side, the HFI identifies that messages was generated from a multicast. This information may be encapsulated in the message generated in the originator under various schemes, such as using a free bit of the header (e.g., a header bit that is not required for separate use by the network protocol used by the Fabric).

Figure 5:
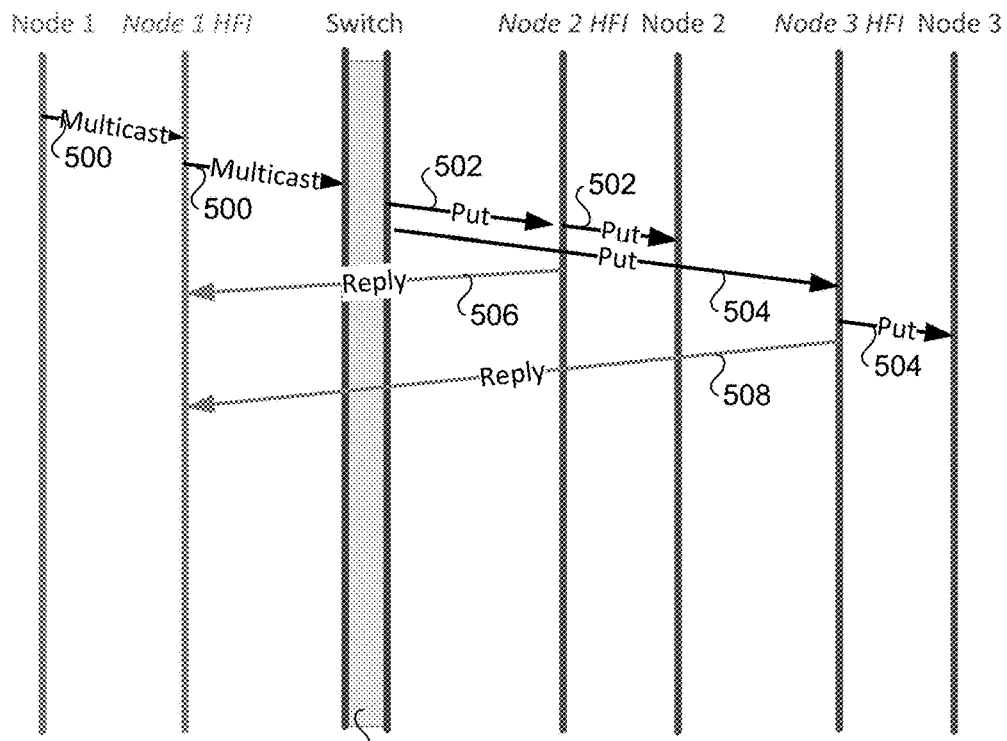
FIG. 5 is a message flow diagram illustrating a hardware-based reliable delivery scheme under which reliability mechanisms in originator and target nodes are implemented in the HFIs for those nodes.

FIG. 5 illustrates an example message flow for a multicast message sent from Node 1 to Node 2 and Node 3; this scheme can be extended to deliver the multicast message to any number of nodes. Software (e.g., as part of a network software stack) operating on Node 1 generates a multicast request 500 that is sent to switch 100 via Node 1's HFI. Switch 100 extracts the destination addresses identified in the multicast request (or other applicable indicia) (in this instance the Fabric addresses for Nodes 2 and 3), and generates corresponding unicast messages 502 and 704. Upon receiving multicast request 500, switch 100 extracts the destination addresses identified in the multicast request (in this example the Fabric addresses for Nodes 2 and 3), or other indicia via which the target nodes may be identified, and generates unicast put messages 502 and 504, which are respectively sent to Nodes 2 and 3 via each node's HFI. As discussed above, each unicast put message includes a multicast ID that identifies the put message as a multicast message and further identifies the originator node and/or the Fabric address of the HFI for the originator node, which informs the target node's HFI to where its reply message is to be sent.

Upon receipt of message 502, Node 2's HFI verifies the message has been stored in memory and forwards message 502 (or data content encapsulated in message 502) to Node 2, and returns a reply message 506 (e.g., an ACK) to Node 1's HFI confirming successful delivery of the multicast message by Node 2. Similarly, upon receipt of message 504, Node 3's HFI verifies the message has been stored in persistent memory, forwards message 504 to Node 3, and returns a reply message 508 to Node 1's HFI. Upon receipt of reply messages 506 and 508, Node 1's HFI clears the pending acknowledgement list entries for Nodes 2 and 3. When all entries in the pending acknowledgement list are cleared prior to expiration of the timeout counter, the timeout counter is terminated.

Figure 6:
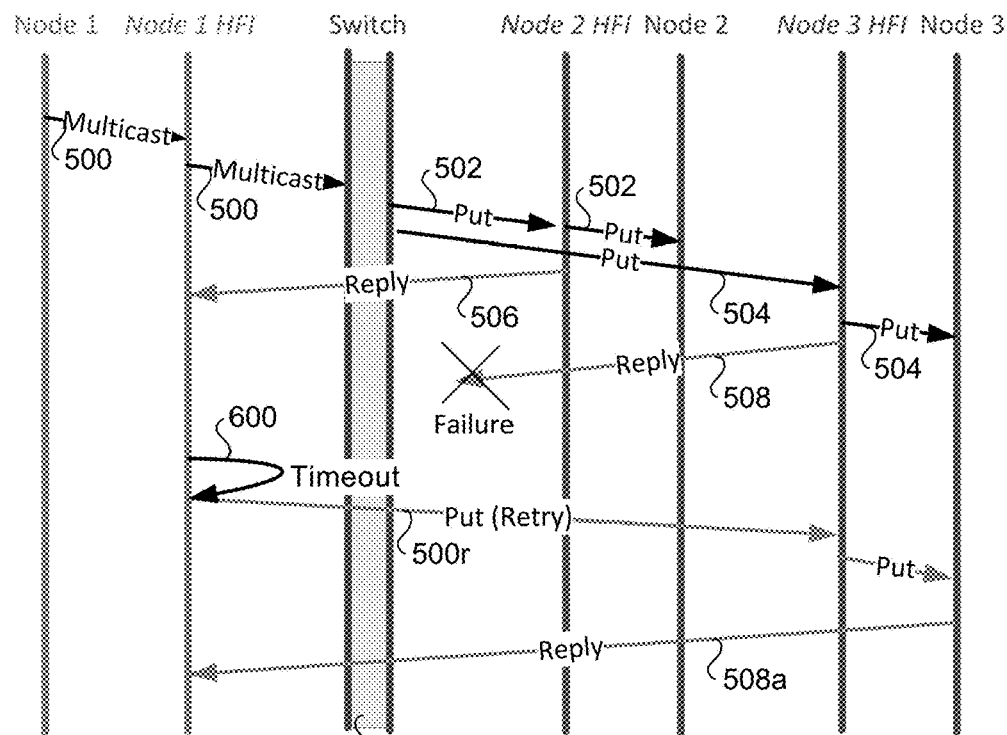
FIG. 6 is a message flow diagram illustrating an embodiment of the hardware-based reliable delivery scheme, illustrating how a failure to deliver a reply message is handled via logic in the HFI for an originator node.

FIG. 6 illustrates a similar message flow as FIG. 5, except in this example reply message 508 is not successfully returned to Node 1. At some subsequent point in time, the timeout counter will expire, as indicated by a timeout 600. In response, Node 1's HFI will look to its pending acknowledgement list and resend the original multicast message 500 as a unicast retry message to each target node that has not been cleared; in this case, Node 3 has not been cleared due to the failure of reply message 508. Thus, Node 1's HFI will send a unicast retry message 500a to Node 3. Upon receipt at Node 3's HFI, the HFI inspects the packet header and observes this is a retry message, which is to be forwarded to Node 3. The network software stack in Node 3 then returns a second reply message 508a to Node 1, which is successfully transferred to Node 1 in this example.

HFI Active-Passive Reliable-Multicast Implementation

The foregoing solution can be expensive in terms of complexity, area, and power constraints in the HFI side. Accordingly, a Software/Hardware (SW/HW) co-designed (hybrid) extension is also proposed. Under this second hybrid approach, the target node still behaves as a passive actor (e.g., the message is stored by the HFI to memory and acknowledgement is generated by the HFI with no SW interaction). However, the originator network software stack becomes an active actor with regards to the retry mechanism. In this hybrid embodiment, the information and mechanisms presented in points 1 to 4 in the HW-based approach discussed above are implemented at the software level. Thus, the network software stack is extended to implement the retry mechanism. In addition, the HFI is configured to notify the receipt of a reply message by issuing a notification to user space of an applicable software application initiating the multicast message via a system software interrupt.

Figure 7:
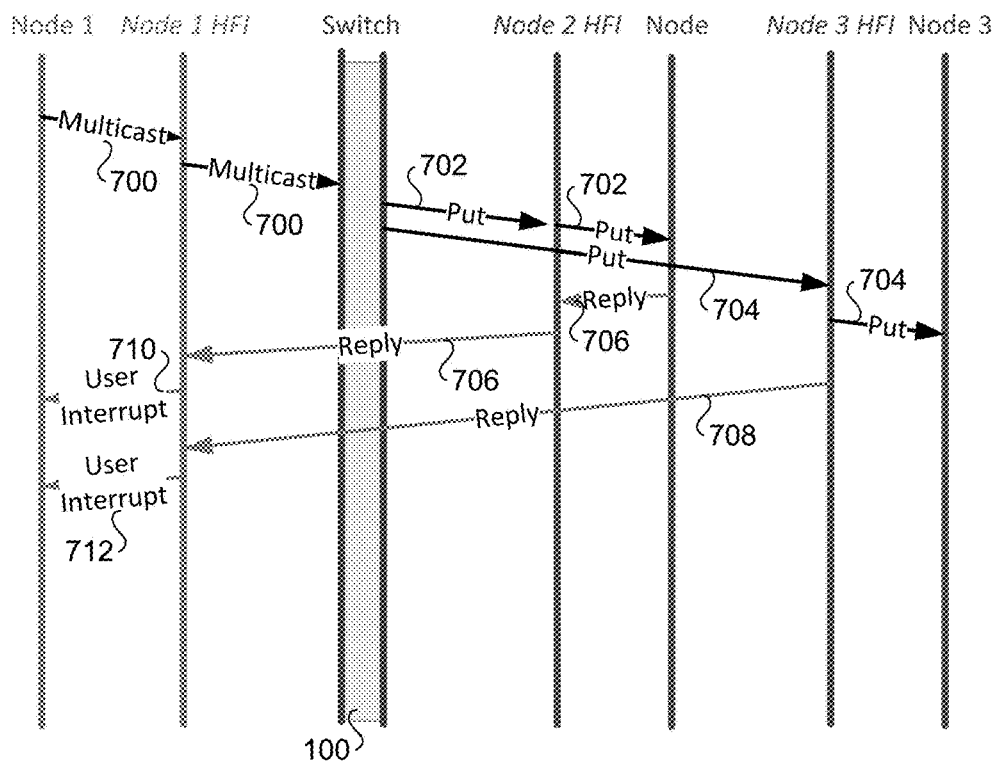
FIG. 7 is a message flow diagram illustrating an embodiment of a hybrid software/hardware-based reliable delivery scheme under which a reliability mechanism in originator node are implemented in software while an associated reliability mechanism for sending reply messages is implemented in the HFIs of the target nodes.
Figure 8:
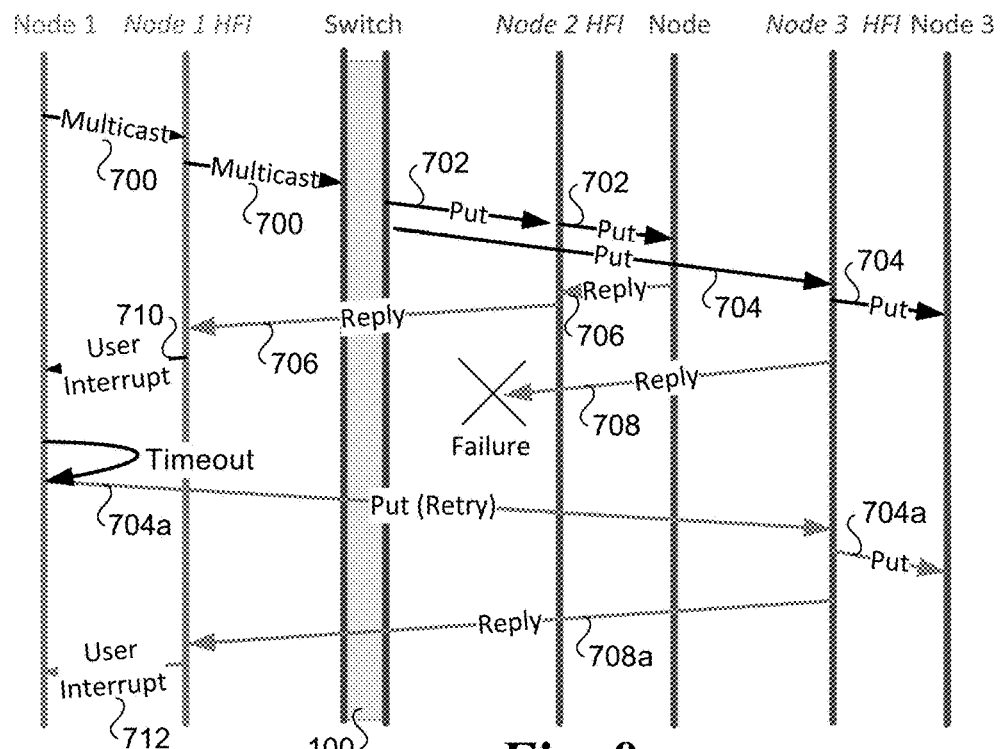
FIG. 8 is a message flow diagram illustrating an embodiment of the hybrid software/hardware-based reliable delivery scheme, illustrating how a failure to deliver a reply message is handled via software in the originator node.

Message flow diagrams corresponding to one embodiment of the hybrid SW/HW approach are shown in FIGS. 7 and 8. As before, the message flow begins with a multicast message 700 being sent to switch 100, which extracts the destination addresses identified in the multicast message (e.g., the Fabric addresses for Nodes 2 and 3), and generates corresponding unicast messages 702 and 704 that are respectively transmitted from switch 100 to Node 2 and Node 3.

Upon receipt of message 702, Node 2's HFI verifies the message has been stored in memory, forwards message 702 to Node 2, and returns a reply message 706 (e.g., an ACK) to Node 1's HFI. Similarly, upon receipt of message 704, Node 3's HFI verifies the message has been stored in persistent memory, forwards message 704 to Node 3, and returns a reply message 708 to Node 1's HFI. Upon receipt of reply messages 706 and 708, Node 1's HFI generates a pair of user interrupts 710 and 712 to inform the network software stack on Node 1 that originated the multicast message that each of Nodes 2 and 3 have confirmed delivery of the message. In a manner similar to that discussed above for the HFI at the originator node, a network software stack maintains a table listing the destination nodes, and clears each node's entry in response to receiving a user interrupt identifying a target node has confirmed delivery of a message sent to that target node.

FIG. 8 shows how message failures are handled under one embodiment of the hybrid SW/HW approach. In this example, reply 706 is successfully received by Node 1's HFI, which generates a user interrupt 710, as before. However, transmission of reply message 708 results in a failure. This time, the timeout timer is implemented via a software entity (e.g., as part of a network software stack) on the originator node (Node 1). When the timeout timer expires, the software entity checks its list of pending acknowledgements and detects that a reply message has not been received from Node 3 confirming delivery of (a unicast message corresponding to) multicast message 700. In response, the software entity sends a unicast message 700a corresponding to multicast message 700 to Node 3. In a manner similar to that described above, Node 3's HFI forwards message 704a to Node 3, and also returns a reply message 708a to Node 1. Upon receipt of reply message 708a, Node 1's HFI generates a user interrupt 712 to inform the software entity on Node 1 that message 700 has been successfully delivered to Node 3.

Exemplary Implementation Environment

Aspects of the embodiments described herein may be implemented in networks and/or systems employing various types of fabric architectures. In one embodiment, an exemplary fabric employs an architecture that defines a message passing, switched, server interconnection network. The architecture spans the OSI Network Model Layers 1 and 2, leverages IETF Internet Protocol for Layer 3, and includes a combination of new and leveraged specifications for Layer 4 of the architecture.

The architecture may be implemented to interconnect CPUs of computer platforms and other subsystems that comprise a logical message passing configuration, either by formal definition, such as a supercomputer, or simply by association, such a group or cluster of servers functioning in some sort of coordinated manner due to the message passing applications they run, as is often the case in cloud computing. The interconnected components are referred to as nodes. The architecture may also be implemented to interconnect processor nodes with an SoC, multi-chip module, or the like. One type of node, called a Host, is the type on which user-mode software executes. In one embodiment, a Host comprises a single cache-coherent memory domain, regardless of the number of cores or CPUs in the coherent domain, and may include various local I/O and storage subsystems. The type of software a Host runs may define a more specialized function, such as a user application node, or a storage or file server, and serves to describe a more detailed system architecture.

At a top level, the architecture defines the following components:
Host Fabric Interfaces (HFIs);
Links;
Switches;
Gateways; and
A comprehensive management model.

Host Fabric Interfaces minimally consist of the logic to implement the physical and link layers of the architecture, such that a node can attach to a fabric and send and receive packets to other servers or devices. HFIs include the appropriate hardware interfaces and drivers for operating system and VMM (Virtual Machine Manager) support. An HFI may also include specialized logic for executing or accelerating upper layer protocols and/or offload of transport protocols, including the reliability operations implemented by the embodiments disclosed herein. An HFI also includes logic to respond to messages from network management components. Each Host is connected to the architecture fabric via an HFI.

In one embodiment, links are full-duplex, point-to-point interconnects that connect HFIs to switches, switches to other switches, or switches to gateways. Links may have different physical configurations, in circuit board traces, copper cables, or optical cables. In one embodiment the implementations the PHY (Physical layer), cable, and connector strategy is to follow those for Ethernet, specifically 100 GbE (100 gigabits per second Ethernet, such as the Ethernet links defined in IEEE 802.3bj 2014. The architecture is flexible, supporting use of future Ethernet or other link technologies that may exceed 100 GbE bandwidth. High-end supercomputer products may use special-purpose (much higher bandwidth) PHYs, and for these configurations interoperability with architecture products will be based on switches with ports with differing PHYs.

Switches are OSI Layer 2 components, and are managed by the architecture's management infrastructure. The architecture defines Internet Protocol as its OSI Layer 3, or Inter-networking Layer, though the architecture does not specify anything in the IP domain, nor manage IP-related devices. Devices that support connectivity between the architecture fabric and external networks, especially Ethernet, are referred to as gateways. Lightweight gateways may offer reduced functionality and behave strictly at Ethernet's layer 2. Full featured gateways may operate at Layer 3 and above, and hence behave as routers. The Gateway specifications provided by the architecture include mechanisms for Ethernet encapsulation and how gateways can behave on the fabric to permit flexible connectivity to Ethernet data center networks consistent with the rest of the architecture. The use of IP as the inter-networking protocol enables IETF-approved transports, namely TCP, UDP, and SCTP, to be used to send and receive messages beyond the architecture's fabric.

Figure 9:
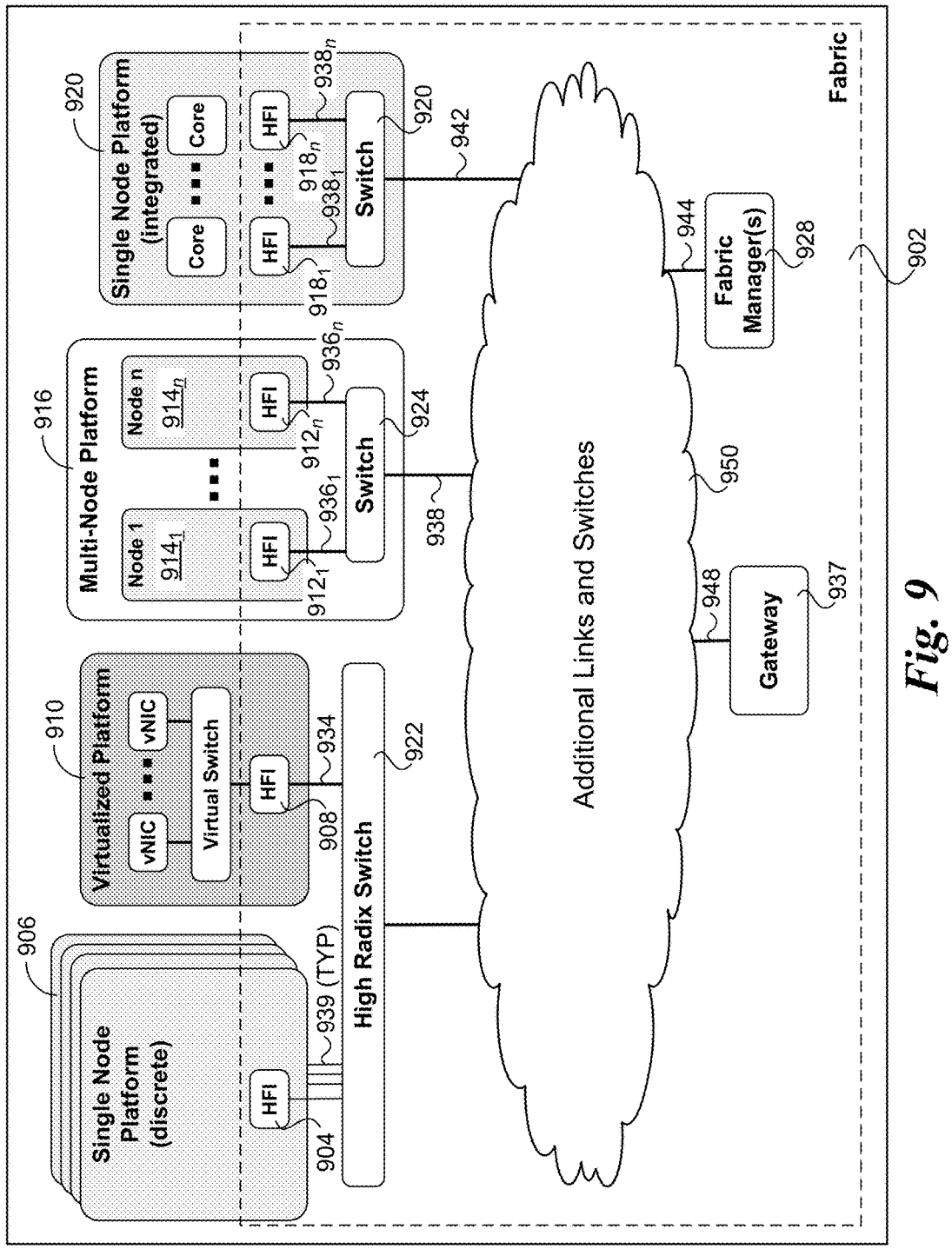
FIG. 9 is a schematic diagram illustrating a high-level view of a system comprising various components and interconnects of the fabric architecture, according to one embodiment.

FIG. 9 shows a high-level view of a system 900 illustrating various components and interconnects of a system architecture in which various configurations of originator and target nodes may be implemented, according to one embodiment. A central feature of the architecture is the fabric 102, which includes a collection of the HFIs and gateways interconnected via the architectures links and switches. As depicted in FIG. 9, the fabric 902 components includes multiple HFIs 904 (one is shown), each hosted by a respective discrete single node platform 906, an HFI 908 hosted by a virtual platform 910, HFIs $912_1$ and $912_n$ hosted by respective nodes $914_1$ and $914_n$ of a multi-node platform 916, and HFIs $918_1$ and $918_n$ of an integrated single node platform 920, a high radix switch 922, switches 924 and 926, fabric manager(s) 928, a gateway 930, links 932, 934, $936_1$, $936_n$, 938, $940_1$, $940_n$, 942, 944, 948, and additional links and switches collectively shown as a cloud 950.

In one embodiment switches are a Layer 2 devices and act as packet forwarding mechanisms within a fabric. Switches are centrally provisioned and managed by the fabric management software, and each switch includes a management agent to respond to management transactions. Central provisioning means that the forwarding tables are programmed by the fabric management software to implement specific fabric topologies and forwarding capabilities, like alternate routes for adaptive routing. Switches may also be configured to perform forwarding of multicast messages (as individual unicast messages sent to target nodes) in the manner discussed above.

Exemplary System Node with HFI

Figure 10:
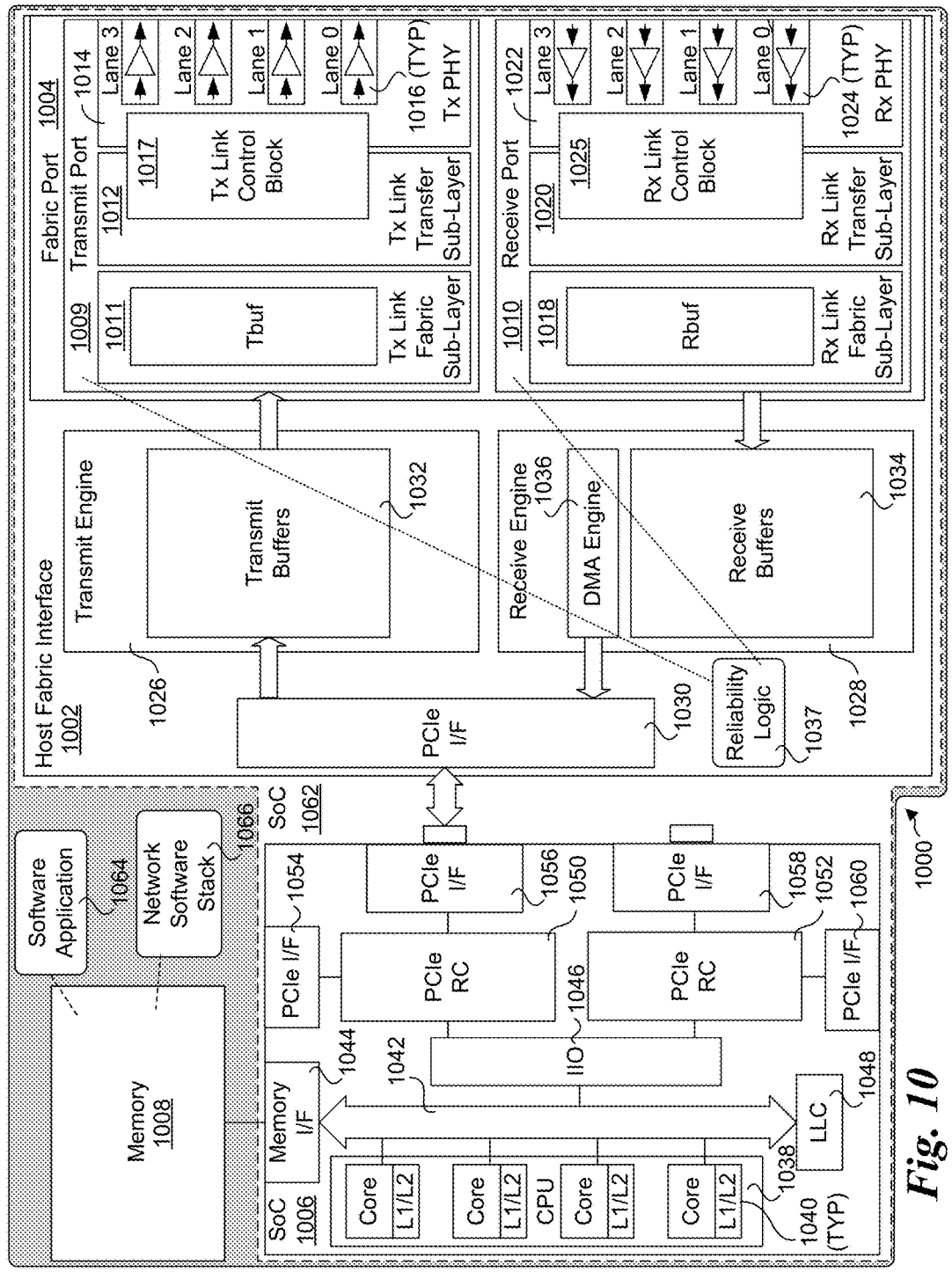
FIG. 10 is a schematic diagram of a node including an HFI, according to one embodiment.

FIG. 10 shows a node 1000 comprising a compute platform having an exemplary configuration comprising a host fabric interface 1002 including a fabric port 1004 coupled to a processor 1006, which in turn is coupled to memory 1008. As shown in FIG. 9, system nodes may have various configurations, such as but not limited to those shown by discrete single node platform 906, virtualized platform 910, multi-node platform 916 and integrated single node platform 920. Generally, each node configuration will comprise a compute platform including at least one processor, memory, and at least one HFI having similar components illustrated in FIG. 10.

Fabric port 1004 includes a transmit port 1009 and a receive port 1010 that are respectively configured to support fabric transmit and receive operations and interfaces. Transmit port 1010 includes Tx Link Fabric Sub-layer circuitry and logic 1011 including a transmit buffer (Tbuf), Tx Link Transfer Sub-layer circuitry and logic 1012, and Tx PHY circuitry and logic 1014 including four transmitters 1016, and a Tx Link Control Block 1017 including Tx reliability logic that supports the HFI. Receive port 1802 includes Rx Link Fabric Sub-layer circuitry and logic 1018 including a receive buffer (Rbuf), Rx Link Transfer Sub-layer circuitry and logic 1020, and Rx PHY circuitry and logic 1022 including four receivers 1024, and an Rx Link Control Block 1025.

Tx Link Fabric Sub-Layer circuitry and logic 1011 is configured to implement the transmit-side aspects of the Link Fabric Sub-Layer operations. In one embodiment, in addition to the transmit buffer illustrated in FIG. 10, components and blocks for facilitating these operations that are not illustrated include a Fabric Packet build block that includes an L4 encapsulation sub-block that is configured to perform L4 encapsulation of Ethernet, InfiniBand, and native architecture packets, arbitration logic, and a credit manager. Additionally a portion of the logic for facilitating Quality of Service (QoS) operations is implemented at the Link Fabric Sub-Layer (also not shown).

Tx Link Transfer Sub-Layer circuitry and logic 1012 is configured to implement the transmit-side aspects of the Link Transfer Sub-Layer operations. In addition, a portion of Tx Link Control Block 1017 and the QoS functions are implemented for the Tx Link Transfer Sub-Layer.

Tx PHY circuitry and logic 1014 is illustrated in a simplified form that includes four transmitters 1016 and a portion of Tx Link Control Block 1017. Generally, transmitters 1016 may comprise electrical or optical transmitters, depending on the PHY layer configuration of the link. It will be understood by those having skill in the networking arts that a Tx PHY circuitry and logic block will including additional circuitry and logic for implementing transmit-side PHY layer operations that are not shown for clarity. This including various sub-layers within a PHY layer that are used to facilitate various features implemented in connection with high-speed interconnect to reduce errors and enhance transmission characteristics.

Rx Link Fabric Sub-Layer circuitry and logic 1018 is configured to implement the receive-side aspects of the Link Fabric Sub-Layer operations. In one embodiment, in addition to the illustrated receive buffer, non-illustrated components and blocks for facilitating these operations include a Fabric Packet reassembly block including an L4 packet de-capsulation sub-block, a credit return block, and a portion of QoS receive-side logic. Rx Link Transfer Sub-Layer circuitry and logic 1020 is configured to implement the receive-side aspects of the Link Transfer Sub-Layer operations Rx PHY circuitry and logic 1022 is illustrated in a simplified form that includes four receivers 1024 and a portion of Rx Link Control Block 1805. Generally, receivers 1024 may comprise electrical or optical transmitters, depending on the PHY layer configuration of the link, and will be configured to receive signals transmitter over the link from transmitters 1016. It will be understood by those having skill in the networking arts that an Rx PHY circuitry and logic block will including additional circuitry and logic for implementing receive-side PHY layer operations that are not shown for clarity. This including various sub-layers within a PHY layer that are used to facilitate various features implemented in connection with high-speed interconnect to reduce errors and enhance transmission characteristics.

HFI 1002 further includes a transmit engine 1026 and a receive engine 1028 coupled to a PCIe (Peripheral Component Interconnect Express) interface (I/F) 1030. Transmit engine 1026 includes transmit buffers 1032 in which L4 packets (e.g., Ethernet packets including encapsulated TCP/IP packets, InfiniBand packets) and/or Fabric Packets are buffered. In one embodiment, all or a portion of the memory for transmit buffers 1032 comprises memory-mapped input/output (MMIO) address space, also referred to a programmed IO (PIO) space. MMIO enables processor 1006 to perform direct writes to transmit buffers 1032, e.g., via direct memory access (DMA writes).

Receive engine 1028 includes receive buffers 1034 and a DMA engine 1036. Receive buffers are used to buffer the output of receive port 1802, which may include Fabric Packets and/or L4 packets. DMA engine 1036 is configured to perform DMA writes to copy the packet data from receive buffers 1034 to memory 1008 and/or one of the memory cache levels in processor 1006. For example, in some embodiments packet header data is DMA'ed to cache, while packet payload data is DMA'ed to memory.

HFI 1002 also includes reliability logic 1037 that is illustrative of the embedded logic employed by an HFI to implement the link reliability aspects associated with HFIs described herein. In an actual implementation, the reliability logic may be implemented as a separate logic block, or it may be implemented in a distributed manner, such as including a portion of the logic in one or both of transmit port 1009 and receive port 1010. For example, in one embodiment a transmit port is configured to implement a timeout timer and transmit retry messages to target nodes that do not return replies acknowledging receipt of multicast messages.

Processor 1006 includes a CPU 1038 having a plurality of processor cores 1040, each including integrated Level 1 and Level 2 (L1/L2) caches and coupled to a coherent interconnect 1042. Also coupled to coherent interconnect 1042 is a memory interface 1044 coupled to memory 1008, an integrated input/output block (IIO) 1046, and a Last Level Cache (LLC) 1048. IIO 1046 provides an interface between the coherent domain employed by the processor cores, memory, and caches, and the non-coherent domain employed for IO components and IO interfaces, including a pair of PCIe Root Complexes (RCs) 1050 and 1052. As is well-known in the art, a PCIe RC sits at the top of a PCIe interconnect hierarchy to which multiple PCIe interfaces and PCIe devices may be coupled, as illustrated by PCIe interfaces 1054, 1056, 1058, and 1060. As shown, PCIe 1056 is coupled to PCIe interface 1030 of HFI 1002.

In some embodiments, such as illustrated in FIG. 10, processor 1006 employs an SoC architecture. In other embodiments, PCIe-related components are integrated in an IO chipset or the like that is coupled to a processor. In yet other embodiments, processor 1012 and one or more HFIs 1002 are integrated on an SoC, such as depicted by the dashed outline of SoC 1062.

As discussed above, under embodiments of discrete single node platform 906, virtualized platform 910, multi-node platform 916 and integrated single node platform 920, one or more HFIs are communicatively-coupled to a host platform, which will include one or more processors (referred to as host processors). Some host platforms are configured with one or more PCIe slots, and the one or more HFIs are implemented on PCIe cards that are installed in the PCIe slots. Alternatively, an HFI (or multiple HFIs) may be integrated on a semiconductor chip or the like that is mounted on a circuit board that includes the one or more host processors, thus supporting communication between the one or more HFIs and the one or more host processors.

As further illustrated in FIG. 10, software applications 1064 and network software stack 1066 comprise software components running on one or more of processor cores 1040 or one or more virtual machines hosted by an operating system running on processor 1006. In addition to these software components, there are additional software components and buffers implemented in memory 1008 to facilitate data transfers between memory 1008 (including applicable cache levels) and transmit engine 1026 and receive engine 1034.

Upon receipt of a message (conveyed as one or more Fabric packets) at receive port 1010, the message data is de-encapsulated (as applicable, depending on the protocol) is temporally stored in the Rbuf, and then written to a memory buffer in receive buffers 1034. Depending on the node configuration, a message push model and/or pull model may be implemented. Under the message push model, receive engine 1028 writes/copies the message data from the memory buffer into memory 1008 and/or to LLC 1048 (e.g., header data to LLC 1048 and body to memory 1008) using DMA engine 1036. Under one embodiment, the message data is written to a pre-allocated portion of memory, and software is configured to detect new data that is written by receive engine 1028 into memory 1008 and/or LLC 1048. In one embodiment, the pre-allocated portion of memory is configured as circular buffers, which are used to temporally stored the message data until it is copied to a memory location allocated to the software-based message consumer (e.g., a software application running on node 1000).

Under the pull model, software running on node 1000 can either check for new message data in receive buffers 1034, or receive engine 1028 can write data to a pre-allocated portion of memory 1008 that provides indicia to the software that new message data has been received and (optionally) where it is stored in receive buffers 1034. The software can then read the data from receive buffers 1034 and copy it into one or both of memory 1008 and LLC 1048 (as applicable). Once the data has been verified as written to the host's memory, indicia is returned to receive engine 1028 indicating the memory buffer can be released.

The embodiments described herein provide reliable transport mechanisms that are built on top of a non-reliable fabric implementation using, at least in part, hardware-based functionality implemented by HFIs. Thus, there is a clear latency benefit with respect to existing approaches. In addition, there is also a clear benefit in terms of network utilization as is shown in FIG. 11.

The graph shows how much traffic is added in the network in order to implement a reliable multicast. The graph only shows the impact if the multicast is using one level of switch for a different number of targets. Additional levels of switches result in further benefits.

Figure 11:
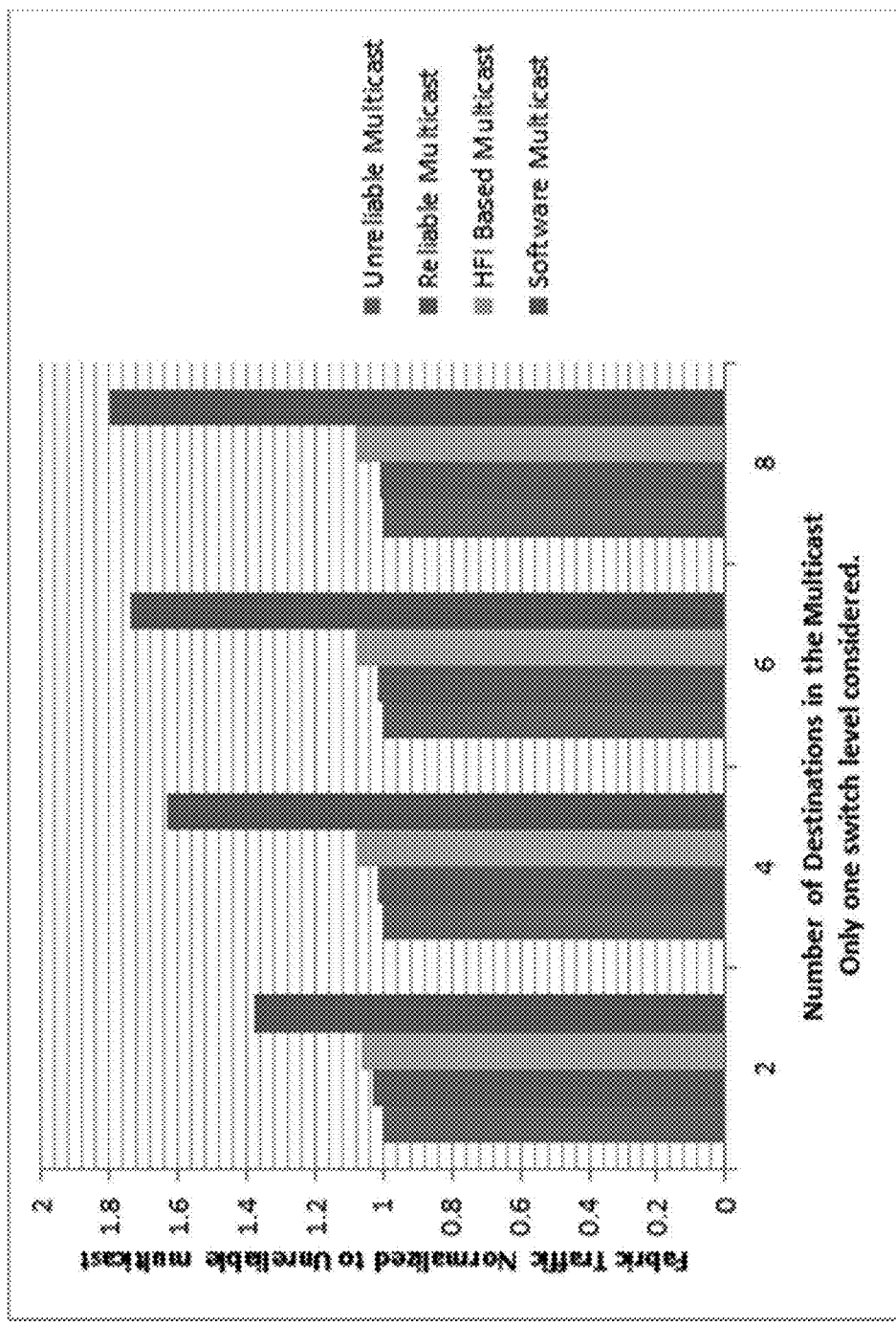
FIG. 11 is a normalized graph comparing a level of fabric traffic for an unreliable multicast, a reliable multicast, an HFI-based multicast, and a software-based multicast.

Values shown in FIG. 11 are normalized relative to sending the same multicast message using a non-reliable multicast. As can be seen, software-based multicast (current solution) can add up to 70% more traffic with respect to non-reliable or Fabric Interconnect reliable multicast. The reliable multicast is the multicast implemented by the switch as discussed above with reference to FIG. 3. The proposed solution, not only provides better latency than the current software-based approach, it's able to implement a reliable multicast by adding only 8% of more traffic in the worst case (in this example).

Further aspects of the subject matter described herein are set out in the following numbered clauses:

1. A method for reliably delivering a multicast message from an originator node to a plurality of target nodes over a non-reliable fabric to which each of the originator node and the plurality of target nodes is coupled, comprising:

sending a multicast message from a Host Fabric Interface (HFI) of the originator node to a switch in the non-reliable fabric, wherein the multicast message is configured to cause the switch to generate and send a respective unicast message corresponding to the multicast message to each of the plurality of target nodes;

receiving, at the HFI for the originator node, one or more reply messages from one or more of the plurality of target nodes, the one or more reply messages indicating that the target node sending the reply message has successfully received the unicast message corresponding to the multicast message sent to the target node;

determining, at the HFI for the originator node, one or more reply messages have yet to be received from one or more of the target nodes within a timeout period; and in response thereto, generating and sending a unicast message corresponding to the multicast message from the HFI for the originator node to each of the one or more target nodes that did not return a reply message to the HFI of the originator node within the timeout period.

2. The method of clause 1, wherein the multicast message is originated by a network software stack operating on the originator node, and the network software stack is not involved in the reliable delivery of the multicast message to each of the target nodes.

3. The method of clause 1 or 2, wherein the HFI for the originator node receives a version of the multicast message having on original format generated by a network software stack operating on the originator node, and wherein the HFI for the originator node adds a multicast identifier (ID) to the original format of the multicast message that is to be used in the reply messages received from the plurality of target nodes.

4. The method of any of the preceding clauses, wherein the HFI for the originator node receives an original multicast message generated by a network software stack operating on the originator node, and wherein the HFI for the originator node employs one or more data structures for tracking replies to a given multicast message, the one or more data structures including:

a) the original multicast message;

b) a timestamp corresponding to when the multicast message is sent from the HFI for the originator node; and c) a list of pending acknowledgements to be received via corresponding reply messages sent from the plurality of target nodes.

5. The method of any of the preceding clauses, wherein the originator node is a first originator node and the multicast message is a first multicast message, further comprising:

receiving, at the HFI for the first originator node, a message from the switch, the message corresponding to a second multicast message originating from a second originator node coupled to the non-reliable fabric; and returning, via the HFI for the first originator node, a reply message to the second originator node confirming receipt of the message corresponding to the second multicast message.

6. The method of clause 5, wherein the originator node includes a network software stack, and the method further comprises forwarding one of the message, content contained in the message, or indicia indicating the message is in a memory buffer on the HFI from the HFI of the originator node to the network software stack.

7. The method of clause 5, wherein the HFI verifies the message has been stored in memory prior to returning the reply message, and the reply message contains an acknowledgement including a multicast identifier (ID) corresponding to the second multicast message.

8. The method of clause 5, further comprising:

receiving, at the HFI for the first originator node, a retry message corresponding to the second multicast message from a second originator node of the second multicast message;

forwarding the retry message or content contained in the retry message from the HFI of the originator node to the network software stack;

generating, via the network software stack, a second reply message and sending the second reply message via the HFI for the first originator node to the second originator node.

9. An apparatus comprising:

a host fabric interface (HFI) including, a transmit port, configured to send data onto an non-reliable fabric;

a receive port, configured to receive data from the non-reliable fabric;

wherein the HFI further is configured to, send a multicast message to a switch in the non-reliable fabric, wherein the multicast message is configured to cause the switch to generate and send a unicast message corresponding to the multicast message to each of the plurality of target nodes via the non-reliable fabric;

maintain indicia identifying which target nodes the multicast message is to be delivered to;

receive one or more reply messages from one or more of the plurality of target nodes via the non-reliable fabric, the one or more reply messages indicating that the target node sending the reply message has successfully received the unicast message corresponding to the multicast message sent to the target node;

determine one or more reply messages have yet to be received from one or more of the target nodes within a timeout period; and in response thereto, generate and send a unicast message corresponding to the multicast message to each of the one or more target nodes that did not return a reply message within the timeout period.

10. The apparatus of clause 9, wherein the HFI is configured to be installed in or attached to a compute platform comprising an originator node, and upon operation is configured to receive a version of the multicast message having on original format originated by a network software stack operating on the originator node, and wherein the HFI if further configured to add an identifier to the original format of the multicast message that is to be used in the reply messages received from the plurality of target nodes.

11. The apparatus of clause 9 or 10, wherein the HFI is configured to be installed in or attached to a compute platform comprising an originator node, and upon operation HFI is configured to receive an original multicast message originated by a network software stack operating on the originator node, and wherein the HFI for the originator node is configured to employ one or more data structures for tracking replies to a given multicast message, the one or more data structures including:
   a) the original multicast message;
   b) a timestamp corresponding to when the multicast message is sent from the HFI; and
   c) a list of pending acknowledgements to be received via corresponding reply messages sent from the plurality of target nodes.

12. The apparatus of any of clauses 9-11, wherein the HFI is configured to be installed in or attached to a compute platform comprising a first originator node and the multicast message is a first multicast message, and wherein the HFI is further configured to:
   receive a message from the switch, the message corresponding to a second multicast message originating from a second originator node coupled to the non-reliable fabric;
   return a reply message to the second originator node confirming receipt of the message corresponding to the second multicast message.

13. The apparatus of clause 12, wherein the first originator node includes a network software stack, and the HFI is further configured to forward one of the message, content contained in the message, or indicia indicating the message is in a memory buffer on the HFI from the HFI to the network software stack.

14. The apparatus of clause 12, wherein the apparatus further comprises one of a host processor to which the HFI is operatively coupled or a host platform in which the HFI is installed, and the apparatus is further configured to:
   receive, via the HFI, a retry message corresponding to the second multicast message from the second originator node;
   forward, from the HFI, the retry message or content contained in the retry message to the network software stack executing on the host processor or host platform; and
   generate, via the network software stack, a second reply message and send the second reply message via the HFI to the second originator node.

15. A method for reliably delivering a multicast message from an originator node including a Host Fabric Interface (HFI) to a plurality of target nodes over a non-reliable fabric to which each of the originator node and the plurality of target nodes is coupled, comprising:
   generating the multicast message via a network software stack operating on the originator node and sending the multicast message from the HFI of the originator node to a switch in the non-reliable fabric, wherein the multicast message is configured to cause the switch to generate and send a unicast message corresponding to the multicast message to each of the plurality of target nodes, each unicast message including indicia identifying at least one of the HFI and the originator node;
   maintaining indicia at the originator node identifying which target nodes the multicast message is to be delivered to;
   receiving, at the HFI for the originator node, one or more reply messages from one or more of the plurality of target nodes, the one or more reply messages indicating that the target node sending the reply message has successfully received the unicast message corresponding to the multicast message sent to the target node;
   for each reply message received at the HFI, notifying the network software stack operating on the originator node;
   determining one or more reply messages have yet to be received from one or more of the target nodes within a timeout period; and
   in response thereto, for each target node for which a reply message has yet to be received,
   generating a unicast message corresponding to the multicast message via the network software stack and sending the unicast message via the HFI to each of the target node.

16. The method of clause 15, wherein the HFI notifies the network software stack using a system software interrupt.

17. The method of clause 15 or 16, wherein the network software stack employs one or more data structures for tracking replies to a given multicast message, the one or more data structures including:
   a) the multicast message;
   b) a timestamp corresponding to when the multicast message is forwarded to the HFI for transmission into the fabric; and
   c) a list of pending acknowledgements to be verified as being received from respective target nodes at the HFI via respective notifications from the HFI.

18. The method of any of clauses 15-18, wherein the originator node is a first originator node and the multicast message is a first multicast message, further comprising:
   receiving, at the HFI, a message from the switch, the message corresponding to a second multicast message originating from a second originator node coupled to the non-reliable fabric;
   returning, via the HFI, a reply message to the second originator node confirming receipt of the message corresponding to the second multicast message.

19. The method of clause 18, further comprising forwarding one of the message, content contained in the message, or indicia indicating the message is in a memory buffer on the HFI from the HFI to the network software stack.

20. The method of clause 18, further comprising:
   receiving, at the HFI for the first originator node, a retry message corresponding to the second multicast message from the second originator node;
   forwarding the retry message or content contained in the retry message from the HFI of the originator node to the network software stack;
   generating, via the network software stack, a second reply message and sending the second reply message via the HFI for the first originator node to the second originator node.

21. An apparatus, configured to be implemented as a node in a network including a plurality of nodes coupled in communication via a non-reliable fabric, the apparatus comprising:
   a host processor, coupled to memory;
   a storage device storing software instructions comprising a plurality of software modules including a network software stack;

a host fabric interface (HFI) including,
a transmit port, configured to send data onto the non-reliable fabric;
a receive port, configured to receive data from the non-reliable fabric;
wherein execution of the software instructions on the host processor or a virtual machine running on the host processor causes the apparatus to,
generate a multicast message to be delivered to a plurality of target nodes and forward the multicast message to the HFI; and
maintain indicia identifying which target nodes the multicast message is to be delivered to;
wherein the HFI is configured to,
send the multicast message to a switch in the non-reliable fabric, wherein the multicast message is configured to cause the switch to generate and send a unicast message corresponding to the multicast message to each of the plurality of target nodes;
receive one or more reply messages from one or more of the plurality of target nodes, each of the one or more reply messages indicating that the target node sending the reply message has successfully received the unicast message corresponding to the multicast message sent to the target node; and
for each reply message received at the HFI, notify the network software stack;
wherein execution of the software instructions further causes the apparatus to,
determine one or more reply messages have yet to be received from one or more of the target nodes within a timeout period; and
in response thereto, for each target node for which a reply message has yet to be received,
generate a unicast message corresponding to the multicast message via the network software stack and send the unicast message via the HFI to the target node.

22. The apparatus of clause 21, wherein the network software stack employs one or more data structures for tracking replies to a given multicast message, the one or more data structures including:
a) the multicast message;
b) a timestamp corresponding to when the multicast message is forwarded to the HFI for transmission into the fabric; and
c) a list of pending acknowledgements to be verified as being received from respective target nodes at the HFI via respective notifications from the HFI.

23. The apparatus of clause 21 or 22, wherein the apparatus is implemented as a first originator node and the multicast message is a first multicast message, and where the HFI is further configured to:
receive a message from the switch, the message corresponding to a second multicast message originating from a second originator node coupled to the non-reliable fabric;
return a reply message to the second originator node confirming receipt of the message corresponding to the second multicast message.

24. The apparatus of clause 23, wherein the apparatus is configured to forward one of the message or content contained in the message from the HFI to the network software stack.

25. The apparatus of clause 23, wherein the apparatus is further configured to:
receive, at the HFI, a retry message corresponding to the second multicast message from the second originator node;
forward the retry message or content contained in the retry message from the HFI to the network software stack; and
generate, via execution of instructions corresponding to the network software stack, a second reply message and send the second reply message via the HFI to the second originator node.

26. A method for reliably delivering a multicast message from an originator node to a plurality of target nodes over a non-reliable fabric to which each of the originator node and the plurality of target nodes is coupled, comprising:
sending a multicast message from a Host Fabric Interface (HFI) of the originator node to a switch in the non-reliable fabric, wherein the multicast message is configured to cause the switch to generate and send a respective unicast message corresponding to the multicast message to each of the plurality of target nodes;
at each of the target nodes,
receiving, at an HFI for the target node, the respective unicast message sent to that target node from the switch; and, in response thereto,
generating, via the HFI for the target node, a reply message and returning the reply message from the target node via the HFI for the target node to the originator node, the reply message indicating that the unicast message corresponding to the multicast message sent to the target node has been received at the target node;
receiving, at the HFI for the originator node, one or more reply messages returned from one or more of the plurality of target nodes;
determining, at the HFI for the originator node, one or more reply messages have yet to be received from one or more of the target nodes within a timeout period; and
in response thereto,
generating and sending a unicast message corresponding to the multicast message from the HFI for the originator node to each of the one or more target nodes that did not return a reply message to the HFI of the originator node within the timeout period.

27. The method of clause 26, further comprising:
wherein the HFI for the originator node receiving, at the HFI for the originator node, a version of the multicast message having on original format generated by a network software stack operating on the originator node;
adding, via the HFI for the originator node, a multicast identifier (ID) to the original format of the multicast message;
extracting, at an HFI for a target node, the multicast ID; and
including the multicast ID in the reply message returned from the target node to the originator node.

28. The method of clause 26 or 27, wherein the HFI for the originator node receives an original multicast message generated by a network software stack operating on the originator node, and wherein the HFI for the originator node employs one or more data structures for tracking replies to a given multicast message, the one or more data structures including:
a) the original multicast message;
b) a timestamp corresponding to when the multicast message is sent from the HFI for the originator node; and
c) a list of pending acknowledgements to be received via corresponding reply messages sent from the plurality of target nodes.

29. The method of any of clauses 26-28, wherein a target node has a network software stack, and the method further comprises forwarding one of the message, content contained in the message, or indicia indicating the message is in a memory buffer on the HFI from the HFI of a target node to the network software stack 30. The method of clause 26-28, wherein the HFI verifies the message has been stored in memory on the target node prior to returning the reply message.

31. The method of any of clauses 26-28, wherein a target node has a network software stack, and the method further comprises:

receiving, at an HFI for a target node, a retry message corresponding to the multicast message sent as a unicast message from the originator node;

forwarding the retry message or content contained in the retry message from the HFI of the target node to the network software stack; and generating, via the network software stack, a second reply message and sending the second reply message via the HFI for the target node to the originator node.

32. The method of any of clauses 26-31, further comprising:

receiving, at the switch, a multicast request including the multicast message from a Host Fabric Interface (HFI) of the originator node; and generating, for each of a plurality of target nodes identified in the multicast request, a respective unicast message corresponding to the multicast message and sending each unicast message from the switch to the target node.

33. A system, including a plurality of components, comprising:

a plurality of nodes, each node including a compute platform coupled to a Host Fabric Interface (HFI);

a switch; and a non-reliable fabric, coupling the HFIs for each of the plurality of nodes in communication via the switch;

wherein the plurality of nodes include an originator node and a plurality of target nodes, and the system components are configured to reliably deliverer a multicast message from the originator node to a plurality of target nodes by performing operations including, sending a multicast request from the HFI of the originator node to the switch, wherein the multicast request includes a multicast message and indicia identifying each of a plurality of target nodes to which the multicast message is to be delivered;

generating, for each of a plurality of target nodes identified in the multicast request, a respective unicast message corresponding to the multicast message and sending each unicast message from the switch to the target node;

at each of the target nodes, receiving, at an HFI for the target node, the respective unicast message sent to that target node from the switch; and, in response thereto, generating, via the HFI for the target node, a reply message and returning the reply message from the target node via the HFI for the target node to the originator node, the reply message indicating that the unicast message corresponding to the multicast message sent to the target node has been received at the target node;

receiving, at the HFI for the originator node, one or more reply messages returned from one or more of the plurality of target nodes;

determining, at the HFI for the originator node, one or more reply messages have yet to be received from one or more of the target nodes within a timeout period; and in response thereto, generating and sending a unicast retry message corresponding to the multicast message from the HFI for the originator node to each of the one or more target nodes that did not return a reply message to the HFI of the originator node within the timeout period.

34. The system of clause 33, wherein the system components are further configured to:

receive, at the HFI for the originator node, a version of the multicast message having on original format generated by a network software stack operating on the originator node;

add, via the HFI for the originator node, a multicast identifier (ID) to the original format of the multicast message;

extract, at an HFI for a target node, the multicast ID; and embed the multicast ID in the reply message returned from the target node to the originator node.

35. The system of clause 33 or 34, wherein the HFI for the originator node receives an original multicast message generated by a network software stack operating on the originator node, and wherein the HFI for the originator node is configured to employ one or more data structures for tracking replies to a given multicast message, the one or more data structures including:

a) the original multicast message;

b) a timestamp corresponding to when the multicast message is sent from the HFI for the originator node; and c) a list of pending acknowledgements to be received via corresponding reply messages returned by the plurality of target nodes.

36. The system of any of clauses 33-35, wherein a compute platform for a target node has at least one host processor that is configured to execute instructions corresponding to a network software stack, and the target node is further configured to forward one of the message, content contained in the message, or indicia indicating the message is in a memory buffer on the HFI from the HFI of a target node to the network software stack.

37. The system of any of clauses 33-35, wherein the HFI for a target node is configured to verify one of the unicast message it receives or data contained in the unicast message has been stored in memory on the target node prior to returning the reply message.

38. The system of any of clauses 33-35, wherein a compute platform for a target node has at least one host processor that is configured to execute instructions corresponding to a network software stack, and the system components are further configured to:

receive, at an HFI for a target node, a retry message corresponding to the multicast message sent as a unicast message from the originator node;

forward the retry message or content contained in the retry message from the HFI of the target node to the network software stack; and generate, via the network software stack, a second reply message and send the second reply message via the HFI for the target node to the originator node.

39. A method for reliably delivering a multicast message from an originator node including a Host Fabric Interface (HFI) to a plurality of target nodes over a non-reliable fabric to which each of the originator node and the plurality of target nodes is coupled, comprising:

generating the multicast message via a network software stack operating on the originator node and sending the multicast message from the HFI of the originator node to a switch in the non-reliable fabric, wherein the multicast message is configured to cause the switch to generate and send a unicast message corresponding to the multicast message to each of the plurality of target nodes, each unicast message including indicia identifying at least one of the HFI and the originator node;

maintaining indicia at the originator node identifying which target nodes the multicast message is to be delivered to;

at each of the target nodes, receiving, at an HFI for the target node, the respective unicast message sent to that target node from the switch; and, in response thereto, generating, via the HFI for the target node, a reply message and returning the reply message from the target node via the HFI for the target node to the originator node, the reply message indicating that the unicast message corresponding to the multicast message sent to the target node has been received at the target node;

receiving, at the HFI for the originator node, one or more reply messages from one or more of the plurality of target nodes;

for each reply message received at the HFI, notifying the network software stack operating on the originator node;

determining one or more reply messages have yet to be received from one or more of the target nodes within a timeout period; and in response thereto, for each target node for which a reply message has yet to be received, generating a retry message corresponding to the multicast message via the network software stack and sending the retry message via the HFI to each of the target nodes.

40. The method of clause 39, wherein the network software stack employs one or more data structures for tracking replies to a given multicast message, the one or more data structures including:
   a) the multicast message;
   b) a timestamp corresponding to when the multicast message is forwarded to the HFI for transmission into the fabric; and
   c) a list of pending acknowledgements to be verified as being received from respective target nodes at the HFI via respective notifications from the HFI.

41. The method of clause 39 or 40, wherein a target node has a network software stack, and the method further comprises forwarding one of the message, content contained in the message, or indicia indicating the message is in a memory buffer on the HFI from the HFI of a target node to the network software stack.

42. The method of clause 41, wherein forwarding one of the message or content contained in the message from the HFI of a target node to the network software stack comprises writing data corresponding to the message or content contained in the message via the HFI into memory on the target node using a direct memory access (DMA).

43. The method of clause 39-41, wherein the HFI verifies data corresponding to the message has been stored in memory on the target node prior to returning the reply message.

44. The method of clause 39, further comprising:

receiving, at the HFI for a target node, a retry message;

forwarding the retry message or content contained in the retry message from the HFI of the target node a network software stack operating on the target node;

generating, via the network software stack operating on the target node, a second reply message and sending the second reply message via the HFI for the target node to the originator node.

45. A system, including a plurality of components, comprising:

a plurality of nodes, each node including a compute platform coupled to a Host Fabric Interface (HFI);

a switch; and a non-reliable fabric, coupling the HFIs for each of the plurality of nodes in communication via the switch;

wherein the plurality of nodes include an originator node and a plurality of target nodes, and the system components are configured to reliably deliverer a multicast message from the originator node to a plurality of target nodes by performing operations including, generating the multicast request via a network software stack operating on the originator node and sending the multicast request from the HFI of the originator node to the switch, wherein the multicast request includes a multicast message and indicia identifying each of a plurality of target nodes to which the multicast message is to be delivered;

generating, for each of a plurality of target nodes identified in the multicast request, a respective unicast message corresponding to the multicast message and sending each unicast message from the switch to the target node;

maintaining indicia at the originator node identifying which target nodes the multicast message is to be delivered to;

at each of the target nodes, receiving, at an HFI for the target node, the respective unicast message sent to that target node from the switch; and, in response thereto, generating, via the HFI for the target node, a reply message and returning the reply message from the target node via the HFI for the target node to the originator node, the reply message indicating that the unicast message corresponding to the multicast message sent to the target node has been received at the target node;

receiving, at the HFI for the originator node, one or more reply messages from one or more of the plurality of target nodes;

for each reply message received at the HFI, notifying the network software stack operating on the originator node;

determining one or more reply messages have yet to be received from one or more of the target nodes within a timeout period; and in response thereto, for each target node for which a reply message has yet to be received, generating a retry message corresponding to the multicast message via the network software stack and sending the retry message via the HFI to each of the target nodes.

46. The system of clause 45, wherein the network software stack employs one or more data structures for tracking replies to a given multicast message, the one or more data structures including:
   a) the multicast message;
   b) a timestamp corresponding to when the multicast message is forwarded to the HFI for transmission into the fabric; and
   c) a list of pending acknowledgements to be verified as being received from respective target nodes at the HFI via respective notifications from the HFI.

47. The system of clause 45 or 46, wherein a compute platform for a target node has at least one host processor that is configured to execute instructions corresponding to a network software stack, and the target node is further configured to forward one of the message, content contained in the message, or indicia indicating the message is in a memory buffer on the HFI from the HFI of a target node to the network software stack.

48. The system of clause 47, wherein forwarding one of the message or content contained in the message from the HFI of a target node to the network software stack comprises writing data corresponding to the message or content contained in the message via the HFI into memory on the target node using a direct memory access (DMA).

49. The system of any of clauses 45-47, wherein the HFI for a target node is configured to verify one of the unicast message it receives or data contained in the unicast message has been stored in memory on the target node prior to returning the reply message.

50. The system of any of clauses 45-47, wherein a compute platform for a target node has at least one host processor that is configured to execute instructions corresponding to a network software stack, and the system components are further configured to:

receive, at an HFI for a target node, a retry message corresponding to the multicast message sent as a unicast message from the originator node;

forward the retry message or content contained in the retry message from the HFI of the target node to the network software stack; and generate, via the network software stack, a second reply message and send the second reply message via the HFI for the target node to the originator node.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

In addition, aspects of embodiments of the present description may be implemented not only within a semiconductor chips, SoCs, multichip modules, etc., but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware instructions executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" or "one or more of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for reliably delivering a multicast message from an originator node to a plurality of target nodes over a non-reliable fabric to which each of the originator node and the plurality of target nodes is coupled, comprising:
    sending a multicast message from a Host Fabric Interface (HFI) of the originator node to a switch in the non-reliable fabric, wherein the multicast message is configured to cause the switch to generate and send a respective unicast message corresponding to the multicast message to each of the plurality of target nodes;
    receiving, at the HFI for the originator node, one or more reply messages from one or more of the plurality of target nodes, the one or more reply messages indicating that the target node sending the reply message has successfully received the unicast message corresponding to the multicast message sent to the target node;
    determining, at the HFI for the originator node, one or more reply messages have yet to be received from one or more of the target nodes within a timeout period; and
    in response thereto,
    generating and sending a unicast message corresponding to the multicast message from the HFI for the originator node to each of the one or more target nodes that did not return a reply message to the HFI of the originator node within the timeout period.

2. The method of claim 1, wherein the multicast message is originated by a network software stack operating on the originator node, and the network software stack is not involved in the reliable delivery of the multicast message to each of the target nodes.

3. The method of claim 1, wherein the HFI for the originator node receives a version of the multicast message having on original format generated by a network software stack operating on the originator node, and wherein the HFI for the originator node adds a multicast identifier (ID) to the original format of the multicast message that is to be used in the reply messages received from the plurality of target nodes.

4. The method of claim 1, wherein the HFI for the originator node receives an original multicast message generated by a network software stack operating on the originator node, and wherein the HFI for the originator node employs one or more data structures for tracking replies to a given multicast message, the one or more data structures including:
    d) the original multicast message;
    e) a timestamp corresponding to when the multicast message is sent from the HFI for the originator node; and
    f) a list of pending acknowledgements to be received via corresponding reply messages sent from the plurality of target nodes.

5. The method of claim 1, wherein the originator node is a first originator node and the multicast message is a first multicast message, further comprising:
    receiving, at the HFI for the first originator node, a message from the switch, the message corresponding to a second multicast message originating from a second originator node coupled to the non-reliable fabric; and
    returning, via the HFI for the first originator node, a reply message to the second originator node confirming receipt of the message corresponding to the second multicast message.

6. The method of claim 5, wherein the originator node includes a network software stack, and the method further comprises forwarding one of the message, content contained in the message, or indicia indicating the message is in a memory buffer on the HFI from the HFI of the originator node to the network software stack.

7. The method of claim 5, wherein the HFI verifies the message has been stored in persistent memory prior to returning the reply message, and the reply message contains an acknowledgement including a multicast identifier (ID) corresponding to the second multicast message.

8. The method of claim 5, further comprising:
receiving, at the HFI for the first originator node, a retry message corresponding to the second multicast message from a second originator node of the second multicast message;
forwarding the retry message or content contained in the retry message from the HFI of the originator node to a network software stack;
generating, via the network software stack, a second reply message and sending the second reply message via the HFI for the first originator node to the second originator node.

9. An apparatus comprising:
a host fabric interface (HFI) including,
    a transmit port, configured to send data onto an non-reliable fabric;
    a receive port, configured to receive data from the non-reliable fabric;
    wherein the HFI further is configured to,
        send a multicast message to a switch in the non-reliable fabric, wherein the multicast message is configured to cause the switch to generate and send a unicast message corresponding to the multicast message to each of the plurality of target nodes via the non-reliable fabric;
        maintain indicia identifying which target nodes the multicast message is to be delivered to;
        receive one or more reply messages from one or more of the plurality of target nodes via the non-reliable fabric, the one or more reply messages indicating that the target node sending the reply message has successfully received the unicast message corresponding to the multicast message sent to the target node;
        determine one or more reply messages have yet to be received from one or more of the target nodes within a timeout period; and
        in response thereto,
            generate and send a unicast message corresponding to the multicast message to each of the one or more target nodes that did not return a reply message within the timeout period.

10. The apparatus of claim 9, wherein the HFI is configured to be installed in or attached to a compute platform comprising an originator node, and upon operation is configured to receive a version of the multicast message having on original format originated by a network software stack operating on the originator node, and wherein the HFI is further configured to add an identifier to the original format of the multicast message that is to be used in the reply messages received from the plurality of target nodes.

11. The apparatus of claim 9, wherein the HFI is configured to be installed in or attached to a compute platform comprising an originator node, and upon operation HFI is configured to receive an original multicast message originated by a network software stack operating on the originator node, and wherein the HFI for the originator node is configured to employ one or more data structures for tracking replies to a given multicast message, the one or more data structures including:
d) the original multicast message;
e) a timestamp corresponding to when the multicast message is sent from the HFI; and
f) a list of pending acknowledgements to be received via corresponding reply messages sent from the plurality of target nodes.

12. The apparatus of claim 9, wherein the HFI is configured to be installed in or attached to a compute platform comprising a first originator node and the multicast message is a first multicast message, and wherein the HFI is further configured to:
receive a message from the switch, the message corresponding to a second multicast message originating from a second originator node coupled to the non-reliable fabric;
return a reply message to the second originator node confirming receipt of the message corresponding to the second multicast message.

13. The apparatus of claim 12, wherein the first originator node includes a network software stack, and the HFI is further configured to forward one of the message, content contained in the message, or indicia indicating the message is in a memory buffer on the HFI from the HFI to the network software stack.

14. The apparatus of claim 12, wherein the apparatus further comprises one of a host processor to which the HFI is operatively coupled or a host platform in which the HFI is installed, and the apparatus is further configured to:
receive, via the HFI, a retry message corresponding to the second multicast message from the second originator node;
forward, from the HFI, the retry message or content contained in the retry message to a network software stack executing on the host processor or host platform; and
generate, via the network software stack, a second reply message and send the second reply message via the HFI to the second originator node.

15. A method for reliably delivering a multicast message from an originator node including a Host Fabric Interface (HFI) to a plurality of target nodes over a non-reliable fabric to which each of the originator node and the plurality of target nodes is coupled, comprising:
generating the multicast message via a network software stack operating on the originator node and sending the multicast message from the HFI of the originator node to a switch in the non-reliable fabric, wherein the multicast message is configured to cause the switch to generate and send a unicast message corresponding to the multicast message to each of the plurality of target nodes, each unicast message including indicia identifying at least one of the HFI and the originator node;
maintaining indicia at the originator node identifying which target nodes the multicast message is to be delivered to;
receiving, at the HFI for the originator node, one or more reply messages from one or more of the plurality of target nodes, the one or more reply messages indicating that the target node sending the reply message has successfully received the unicast message corresponding to the multicast message sent to the target node;
for each reply message received at the HFI, notifying the network software stack operating on the originator node;
determining one or more reply messages have yet to be received from one or more of the target nodes within a timeout period; and in response thereto, for each target node for which a reply message has yet to be received,
generating a unicast message corresponding to the multicast message via the network software stack and sending the unicast message via the HFI to each of the target node.

16. The method of claim 15, wherein the HFI notifies the network software stack using a system software interrupt.

17. The method of claim 15, wherein the network software stack employs one or more data structures for tracking replies to a given multicast message, the one or more data structures including:
   d) the multicast message;
   e) a timestamp corresponding to when the multicast message is forwarded to the HFI for transmission into the fabric; and
   f) a list of pending acknowledgements to be verified as being received from respective target nodes at the HFI via respective notifications from the HFI.

18. The method of claim 15, wherein the originator node is a first originator node and the multicast message is a first multicast message, further comprising:
   receiving, at the HFI, a message from the switch, the message corresponding to a second multicast message originating from a second originator node coupled to the non-reliable fabric;
   returning, via the HFI, a reply message to the second originator node confirming receipt of the message corresponding to the second multicast message.

19. The method of claim 18, further comprising forwarding one of the message, content contained in the message, or indicia indicating the message is in a memory buffer from the HFI to the network software stack.

20. The method of claim 18, further comprising:
   receiving, at the HFI for the first originator node, a retry message corresponding to the second multicast message from the second originator node;
   forwarding the retry message or content contained in the retry message from the HFI of the originator node to the network software stack;
   generating, via the network software stack, a second reply message and sending the second reply message via the HFI for the first originator node to the second originator node.

21. An apparatus, configured to be implemented as a node in a network including a plurality of nodes coupled in communication via a non-reliable fabric, the apparatus comprising:
   a host processor, coupled to memory;
   a storage device storing software instructions comprising a plurality of software modules including a network software stack;
   a host fabric interface (HFI) including,
      a transmit port, configured to send data onto the non-reliable fabric;
      a receive port, configured to receive data from the non-reliable fabric;
   wherein execution of the software instructions on the host processor or a virtual machine running on the host processor causes the apparatus to,
      generate a multicast message to be delivered to a plurality of target nodes and forward the multicast message to the HFI; and
      maintain indicia identifying which target nodes the multicast message is to be delivered to;
   wherein the HFI is configured to,
      send the multicast message to a switch in the non-reliable fabric, wherein the multicast message is configured to cause the switch to generate and send a unicast message corresponding to the multicast message to each of the plurality of target nodes;
      receive one or more reply messages from one or more of the plurality of target nodes, each of the one or more reply messages indicating that the target node sending the reply message has successfully received the unicast message corresponding to the multicast message sent to the target node; and
      for each reply message received at the HFI, notify the network software stack;
   wherein execution of the software instructions further causes the apparatus to,
      determine one or more reply messages have yet to be received from one or more of the target nodes within a timeout period; and
      in response thereto, for each target node for which a reply message has yet to be received,
      generate a unicast message corresponding to the multicast message via the network software stack and send the unicast message via the HFI to the target node.

22. The apparatus of claim 21, wherein the network software stack employs one or more data structures for tracking replies to a given multicast message, the one or more data structures including:
   g) the multicast message;
   h) a timestamp corresponding to when the multicast message is forwarded to the HFI for transmission into the fabric; and
   f) a list of pending acknowledgements to be verified as being received from respective target nodes at the HFI via respective notifications from the HFI.

23. The apparatus of claim 21, wherein the apparatus is implemented as a first originator node and the multicast message is a first multicast message, and where the HFI is further configured to:
   receive a message from the switch, the message corresponding to a second multicast message originating from a second originator node coupled to the non-reliable fabric;
   return a reply message to the second originator node confirming receipt of the message corresponding to the second multicast message.

24. The apparatus of claim 23, wherein the apparatus is configured to forward one of the message, content contained in the message, or indicia indicating the message is in a memory buffer on the HFI from the HFI to the network software stack.

25. The apparatus of claim 23, wherein the apparatus is further configured to:
   receive, at the HFI, a retry message corresponding to the second multicast message from the second originator node;
   forward the retry message or content contained in the retry message from the HFI to the network software stack; and
   generate, via execution of instructions corresponding to the network software stack, a second reply message and send the second reply message via the HFI to the second originator node.

* * * * *